US012625344B2

(12) United States Patent
Hsu

(10) Patent No.: US 12,625,344 B2
(45) Date of Patent: May 12, 2026

(54) FIXING MECHANISM FOR AN OPTICAL ELEMENT COMPRISING FIRST AND SECOND FIXING RODS AND PROJECTION DEVICE

(71) Applicant: Coretronic Corporation, Hsin-Chu (TW)

(72) Inventor: Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 641 days.

(21) Appl. No.: 18/071,659

(22) Filed: Nov. 30, 2022

(65) Prior Publication Data

US 2023/0176316 A1     Jun. 8, 2023

(30) Foreign Application Priority Data

Dec. 3, 2021    (CN) .......................... 202123033358.9

(51) Int. Cl.
*G02B 7/02* (2021.01)
*G03B 21/14* (2006.01)

(52) U.S. Cl.
CPC ........... *G02B 7/022* (2013.01); *G03B 21/145* (2013.01)

(58) Field of Classification Search
CPC .......... G02B 7/06; G02B 7/022; G02B 7/006; G02B 27/646; G03B 21/145; G03B 21/142
See application file for complete search history.

(56) References Cited

U.S. PATENT DOCUMENTS

2015/0153536 A1*  6/2015  Wu ....................... G03B 21/142
                                                  359/819
2020/0249416 A1*  8/2020  Liu ....................... G03B 21/145
2020/0386986 A1*  12/2020  Chen .................... G02B 26/101

FOREIGN PATENT DOCUMENTS

CN        209842318 U   * 12/2019   ........ G02B 26/0875
CN        211905959 U   * 11/2020
TW          I230805 B      4/2005

* cited by examiner

*Primary Examiner* — Paul C Lee

(57) ABSTRACT

A fixing mechanism provided for fixing an optical element includes a first fixing rod and a second fixing rod. The first fixing rod has a first sidewall and forms a first groove. The first sidewall is connected to a first extending portion protruding outward from the first sidewall and a first abutting portion. The first groove is located beside the first extending portion. The first extending portion is connected between the first sidewall and the first abutting portion. The second fixing rod has a second sidewall and forms a second groove. The second groove faces the first groove. A first end of the optical element is accommodated in the first groove, and a second end of the optical element is accommodated in the second groove. The first abutting portion abuts against the optical element thereby fixing the optical element in the fixing mechanism. A projection device is also provided.

12 Claims, 3 Drawing Sheets

FIXING MECHANISM FOR AN OPTICAL ELEMENT COMPRISING FIRST AND SECOND FIXING RODS AND PROJECTION DEVICE

CROSS-REFERENCE TO RELATED APPLICATION

This application claims the priority benefit of China application (202123033358.9), filed on Dec. 3, 2021. The entirety of the above-mentioned patent application is hereby incorporated by reference herein and made a part of this specification.

FIELD OF THE INVENTION

The invention relates to a fixing mechanism, and more particularly to a fixing mechanism for an optical element and a projection device using the fixing mechanism.

BACKGROUND OF THE INVENTION

The types of light sources used in projection devices have evolved from UHP lamps, light emitting diodes (LEDs) to laser diodes (LDs) as the market demands brightness, color saturation, longevity, and non-toxic environmental protection for projection devices.

In order to effectively utilize the light emitted by the light source, various optical elements are arranged in the projection device to perform functions such as light splitting or light transmitting. When setting the optical element, a suitable slot will be designed according to the shape and size of the optical element to insert and fix the optical element, so the thickness of the optical element is proportional to the width of the slot.

However, in the conventional fixing mechanism, the thickness of the optical element may cannot be completely matched with the width of the slot due to the tolerance of the slot (e.g. produced by the manufacturing process), which may cause the optical element to vibrate after being inserted into the slot. As a result, the light transmitted through the optical element will be shift, which will cause uneven brightness distribution in the projected image.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a fixing mechanism for fixing an optical element, so as to reduce the shift of light transmitted by the optical element.

The present invention provides a projection device that can fix optical elements and improve the brightness uniformity of the projection image.

Other advantages and objects of the invention may be further illustrated by the technical features broadly embodied and described as follows.

In order to achieve one or part or all of the above-mentioned purposes or other purposes, the fixing mechanism provided by the invention is for fixing an optical element. The fixing mechanism includes a first fixing rod and a second fixing rod. The first fixing rod has a first sidewall and forms a first groove. The first sidewall is connected to a first extending portion protruding outward from the first sidewall and a first abutting portion. The first groove is located beside the first extending portion. The first extending portion is connected between the first sidewall and the first abutting portion. The second fixing rod has a second sidewall and forms a second groove. The second groove faces the first groove. A first end of the optical element is accommodated in the first groove, and a second end of the optical element is accommodated in the second groove. The first abutting portion abuts against the optical element thereby fixing the optical element in the fixing mechanism.

In one embodiment, the first extending portion includes an extending block. A first side of the extending block is connected to the first sidewall, and a second side of the extending block is connected to the first abutting portion.

In one embodiment, the extending block is flexible.

In one embodiment, the first abutting portion includes a bump structure. The bump structure protrudes from the first extending portion toward the optical element.

In one embodiment, the first groove has a first side surface and a second side surface opposite to each other. The first extending portion is adjacent to the first side surface. A shortest distance from a top of the bump structure to a plane extending from the second side surface is smaller than a distance from the first side surface to the second side surface.

In one embodiment, the first fixing rod further has a first top surface and a first bottom surface. The first sidewall is connected to the first top surface and the first bottom surface. The first groove extends from the first top surface toward the first bottom surface. The second fixing rod further has a second top surface and a second bottom surface. The second sidewall is connected to the second top surface and the second bottom surface. The second groove extends from the second top surface toward the second bottom surface.

In one embodiment, the first groove has a first opening, the second groove has a second opening, and the first opening is aligned with the second opening.

In one embodiment, the second fixing rod further has a second extending portion protruding outward from the second sidewall and a second abutting portion. The second groove is located beside the second extending portion. The second extending portion is connected between the second sidewall and the second abutting portion. The second abutting portion abuts against the optical element.

In one embodiment, the first fixing rod further has a bearing block protruding outward. The bearing block is arranged on a first side of the first groove, and the first extending portion is arranged on a second side of the first groove. The optical element bears against the bearing block when the first abutting portion abuts against the optical element.

In one embodiment, the optical element is in a shape of a flat plate.

In one embodiment, the first sidewall, the first extending portion and the first abutting portion are integrally formed.

In order to achieve one or part or all of the above-mentioned purposes or other purposes, the projection device provided by the invention includes a light source, an optical engine module and a projection lens. The light source is configured to provide an illumination beam. The optical engine module includes a housing, the aforementioned optical element, the aforementioned fixing mechanism, a light-homogenizing element and a light valve. The fixing mechanism is arranged in the housing. The light-homogenizing element is located on a transmission path of the illumination beam and is configured to transmit the illumination beam to the light valve. The light valve is arranged in the housing and located on the transmission path of the illumination beam and is configured to convert the illumination beam into an image beam. The projection lens is arranged in the housing and located on a transmission path of the image beam and is configured to project the image beam out of the projection device. The optical element is arranged on the transmission path of the illumination beam or the transmission path of the image beam.

In the fixing mechanism of the embodiment of the invention, the first fixing rod has the first sidewall, the first fixing rod forms the first groove, the first sidewall is connected to the first extending portion protruding outward from the first sidewall and the first abutting portion, and the second fixing rod forms the second groove. When the optical element is arranged in the fixing mechanism, one end of the optical element is accommodated in the first groove, the other end of the optical element is accommodated in the second grooves, and the first abutting portion connected to the first extending portion is abutted against the optical element. Thus, even though the first groove and the second groove may cause gaps between the optical element and the first groove and the second groove due to tolerances during the manufacture process, the optical element can still be fixed to the fixing mechanism by abutting the first abutting portion against the optical element, thereby reducing the deviation of the transmitted light caused by the shaking of the optical element. Because adopting the fixing mechanism, the projection device of the embodiment of the invention can fix the placement position of the optical element, so as to reduce the light deviation and improve the brightness uniformity of the projection image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
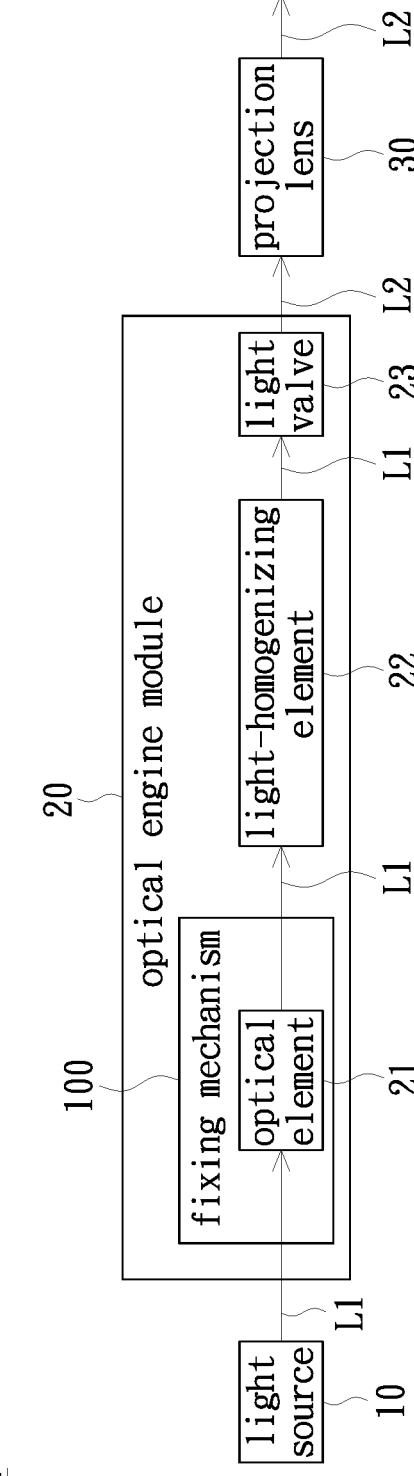
FIG. 1 is a schematic block view of a projection device according to an embodiment of the present invention.

FIG. 1 is a schematic block view of a projection device according to an embodiment of the present invention. Referring to FIG. 1, the projection device 1 of this embodiment includes a light source 10, an optical engine module 20 and a projection lens 30. The light source 10 is used to provide an illumination beam L1. The optical engine module 20 includes a housing 24 (shown in FIG. 2), an optical element 21, a fixing mechanism 100, a light-homogenizing element 22 and a light valve 23. The fixing mechanism 100 and the light valve 23 are arranged in the hosing 24. The light source 10 and the projection lens 30 may be, for example, also arranged in the housing 24. The light-homogenizing element 22 is located on the transmission path of the illumination beam L1 and is used to transmit the illumination beam L1 to the light valve 23. The light valve 23 is located on the transmission path of the illumination beam L1 and is used to convert the illumination beam L1 into an image beam L2. The projection lens 30 is located on the transmission path of the image beam L2 and is used to project the image beam L2 out of the housing of the projection device 1 to a screen or a wall, thereby forming an image on the screen or the wall. In this embodiment, the optical element 21 is arranged on the transmission path of the illumination beam L1 as an example, but the invention is not limited thereto. In another embodiment, the optical element 21 may be arranged on the transmission path of the image beam L2. The fixing mechanism 100 is used to fix the optical element 21.

The light source 10 is, for example, an excitation light source. The excitation light source may include, for example, at least one light-emitting diode or at least one laser diode chip, wherein the at least one light-emitting diode or laser diode may be arranged in a matrix. The excitation light source is used to provide an excitation beam (e.g., illumination beam L1).

The optical element 21 is, for example, a beam splitter or a dichroic mirror. However, the present invention does not particularly limit the type of the optical element 21 as long as the optical element 21 can perform functions such as light splitting or light transmitting. The optical element 21 may be a mirror in other embodiments. The optical element 21 allows light to pass or reflect. Specifically, the optical element 21 is in the shape of a flat plate, so that the fixing mechanism 100 can easily fix the optical element 21 during assembling.

The light-homogenizing element 22 is, for example, a light integration rod or a lens array. The light integration rod performs homogenization of the combined beam by reflecting light, and the lens array adjusts and changes the light shape of the incident beam. In one embodiment, a combination of a light integrator rod and a lens array can be used as the light-homogenizing element 22.

The light valve 23 may be a transmissive light valve or a reflective light valve. The transmissive light valve may be a transmissive liquid crystal panel, such as a transparent liquid crystal panel. The reflective light valve may be a digital micro-mirror device (DMD) or a liquid crystal on silicon panel (LCoS panel). In other embodiments, the light valve 23 is, for example, an electro-optical modulator (EOM), a magneto-optical modulator (MOM), or an acousto-optical modulator (AOM). The present invention does not limit the type and configuration of the light valve 23. The detailed steps and implementation of the method for the light valve 23 to convert the illuminating beam L1 into the image beam L2 can be taught, suggested and implemented by common knowledge in the technical field, and thus no redundant detail is to be given herein. In this embodiment, the quantity of light valves 23 is one, that is, the projection device 1 uses a single digital micro-mirror element. However, the quantity of light valves 23 may be plural in other embodiments, and the present invention is not limited thereto.

The projection lens 30 may include, for example, a combination of one or more optical lenses with non-zero diopter, such as various combinations of non-planar lenses including biconcave lenses, biconvex lenses, meniscus lenses, convex-concave lenses, plano-convex lenses, and plano-concave lenses. In one embodiment, the projection lens 30 may also include a flat optical mirror or a curved optical mirror, so as to project the image beam L2 from the light valve 23 to a wall or a screen in a reflective manner. The present invention does not limit the type and configuration of the projection lens 30.

Hereinafter, the detailed structure and implementation of the fixing mechanism 100 shown in FIG. 1 will be further described.

Figure 2:
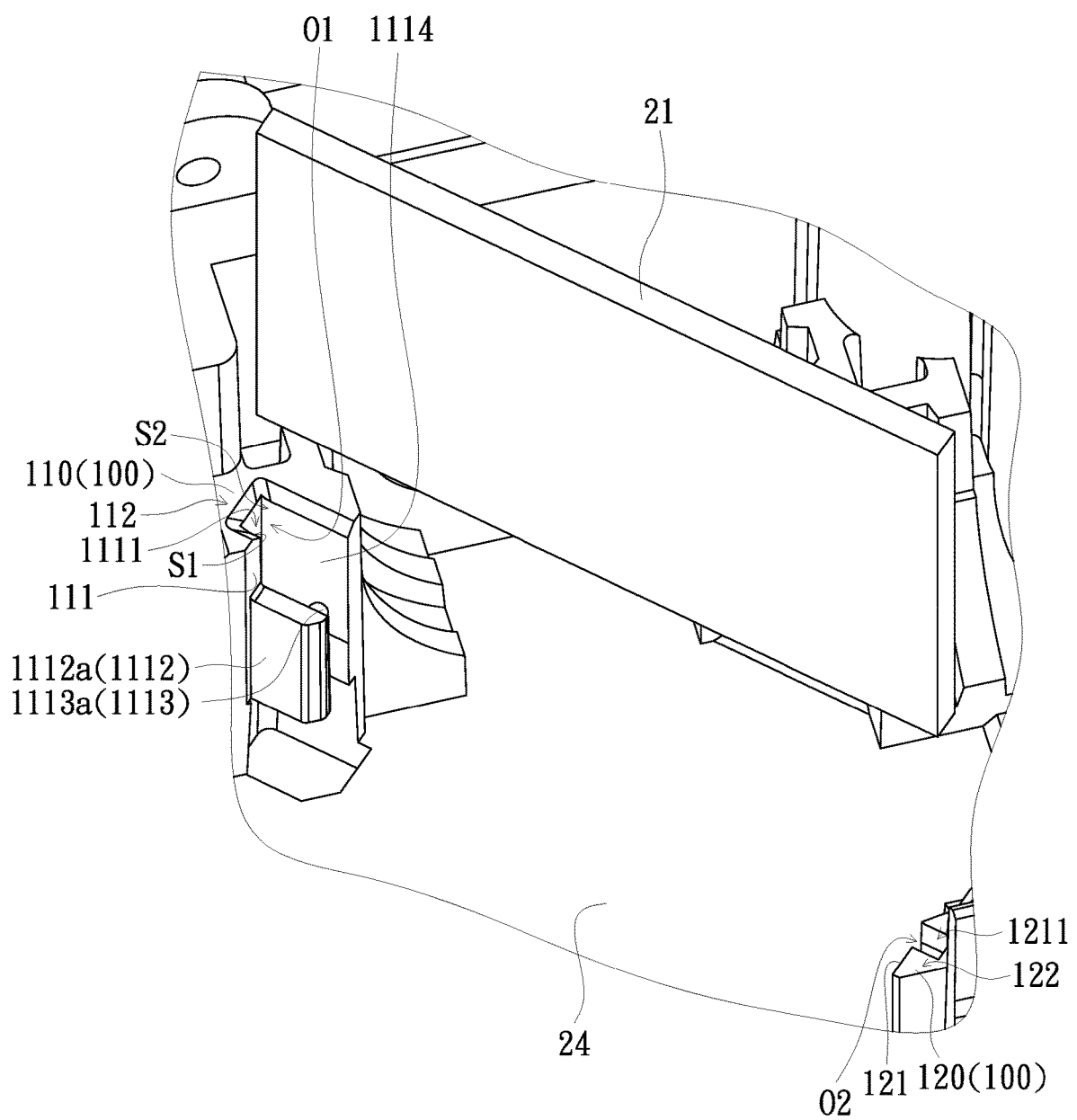
FIG. 2 is an exploded schematic view of a fixing mechanism and an optical element according to an embodiment of the present invention.
Figure 3:
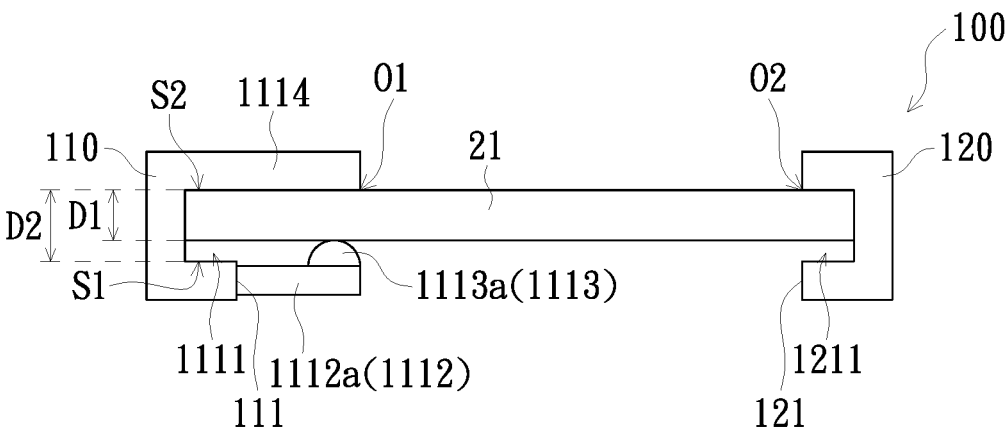
FIG. 3 is a schematic top view of a fixing mechanism fixing an optical element according to an embodiment of the present invention.

FIG. 2 is an exploded schematic view of a fixing mechanism and an optical element according to an embodiment of the present invention. FIG. 3 is a schematic top view of a fixing mechanism fixing an optical element according to an embodiment of the present invention. Please refer to FIGS. 1 to 3. For the convenience of description, only the fixing mechanism 100, the optical element 21 and the housing 24 of the optical engine module 20 are shown in FIG. 2. The fixing mechanism 100 is arranged in the housing 24. The housing 24 and the fixing mechanism 100 are, for example, plastic materials. In this embodiment, the fixing mechanism 100 and the housing 24 are, for example, integrally formed, but not limited thereto. In another embodiment, the fixing mechanism 100 and the housing 24 are two independent and different elements. The fixing mechanism 100 includes a first fixing rod 110 and a second fixing rod 120 which are arranged opposite to each other. The first fixing rod 110 has a first sidewall 111. The first fixing rod 110 forms a first groove 1111. The first sidewall 111 is connected to a first extending portion 1112 protruding outward from the first sidewall 111 and a first abutting portion 1113. The first groove 1111 is located beside the first extending portion 1112. The first extending portion 1112 is connected between the first sidewall 111 and the first abutting portion 1113. The first abutting portion 1113 is arranged in a direction in which the first extending portion 1112 faces the first groove 1111. The second fixing rod 120 has a second sidewall 121. The second fixing rod 120 forms a second groove 1211. The second groove 1211 faces the first groove 1111. In order to clearly show the configuration of the components, the fixing mechanism 100 and the optical element 21 are shown separately in FIG. 2. However, in fact, one end of the optical element 21 is accommodated in the first groove 1111, the other end of the optical element 21 is accommodated in the second groove 1211, and the first abutting portion 1113 is abutted against a surface of the optical element 21, so that the optical element 21 is fixed in the fixing mechanism 100.

In order to ensure that the two ends of the optical element 21 can be smoothly accommodated in the first groove 1111 and the second groove 1211, specifically, the first groove 1111 has a first opening O1, the second groove 1211 has a second opening O2, and the first opening O1 is substantially aligned with the second opening O2. In addition, the first fixing rod 110 further has a first top surface 112 and a first bottom surface opposite to each other. The first sidewall 111 is connected to the first top surface 112 and the first bottom surface. The first groove 1111 extends from the first top surface 112 toward the first bottom surface. Similarly, the second fixing rod 120 further has a second top surface 122 and a second bottom surface opposite to each other. The second sidewall 121 is connected to the second top surface 122 and the second bottom surface. The second groove 1211 extends from the second top surface 122 toward the second bottom surface. Because the first bottom surface and the second bottom surface are connected to the housing 24, the first bottom surface and the second bottom surface are not shown in FIG. 2. That is, the first groove 1111 and the second groove 1211 are shaped like concave rails. Thus, when the optical element 21 is inserted into the fixing mechanism 100 from above the fixing mechanism 100, one end of the optical element 21 can be placed along the first groove 1111 and accommodated in the first groove 1111, and the other end of the optical element 21 can be placed along the second groove 1211 and accommodated in the second groove 1211.

In this embodiment, the first extending portion 1112 includes, for example, an extending block 1112a. One side of the extending block 1112a is connected to the first sidewall 111, and another side of the extending block 1112a is connected to the first abutting portion 1113. The extending block 1112a in this embodiment is shaped like a rectangular parallelepiped as an example, but not limited thereto, as long as the shape and size of the extending block 1112a does not affect the setting of the optical element 21 and can be stably fixed to the fixing mechanism 100.

In this embodiment, the first abutting portion 1113 includes, for example, a bump structure 1113a. The bump structure 1113a protrudes from the first extending portion 1112 in the direction toward the optical element 21. The present invention does not particularly limit the specific shape of the bump structure 1113a, as long as the bump structure 1113*a* can abut against the optical element 21 to fix the optical element 21 in the fixing mechanism 100.

In the fixing mechanism 100 of this embodiment, the first fixing rod 110 has the first sidewall 111, the first fixing rod 110 forms the first groove 1111, the first sidewall 111 is connected to the first extending portion 1112 protruding outward from the first sidewall 111 and the first abutting portion 1113, and the second fixing rod 120 forms the second groove 1211. When the optical element 21 is arranged in the fixing mechanism 100, one end of the optical element 21 is accommodated in the first groove 1111, the other end of the optical element 21 is accommodated in the second grooves 1211, and the first abutting portion 1113 connected to the first extending portion 1112 is abutted against the optical element 21. Thus, even though the first groove 1111 and the second groove 1211 may cause gaps between the optical element 21 and the first groove 1111 and the second groove 1211 due to tolerances during the manufacture process, the optical element 21 can still be fixed to the fixing mechanism 100 by abutting the first abutting portion 1113 against the optical element 21, thereby reducing the deviation of the transmitted light caused by the shaking of the optical element 21. Because adopting the fixing mechanism 100, the projection device 1 of this embodiment can fix the placement position of the optical element 21, so as to reduce the light deviation and improve the brightness uniformity of the projection image.

In this embodiment, the quantity of the fixing mechanisms 100 corresponds to the quantity of the optical elements 21. In FIG. 2, the quantity of the fixing mechanism 100 is one and the quantity of the optical element 21 is one an example, but the invention is not limited thereto. The quantity of the fixing mechanisms 100 is plural when the quantity of the optical elements 21 is plural, for example.

In order to further enhance the fixing effect, the fixing mechanism 100 may further have the following design: the first groove 1111 has a first side surface S1 and a second side surface S2 opposite to each other and respectively arranged on the opposite sides of the first opening O1. The first extending portion 1112 is adjacent to the first side surface S1. When the bump structure 1113*a* (the first abutting portion 1113) abuts against the optical element 21, the shortest linear distance D1 from the top of the bump structure 1113*a* (i.e., the position where the bump structure 1113*a* abuts against the optical element 21) to the extending plane of the second side surface S2 is smaller than the distance D2 from the first side surface S1 to the second side surface S2. The distance D2 can be regarded as the width of the first groove 1111, and the width of the first groove 1111 is slightly larger than the thickness of the optical element 21 due to tolerances. The gap difference between the width of the first groove 1111 and the thickness of the optical element 21 can be compensated by the bump structure 1113*a* (the first abutting portion 1113) of this embodiment. In addition, the extending block 1112*a* (the first extending portion 1112) of this embodiment is flexible. Thus, in accordance with the above design, the optical element 21 will generate a pushing force on the bump structure 1113*a* after being placed in the fixing mechanism 100, and the flexibility of the extending block 1112*a* will generate a reaction force opposite to the pushing force on the connected bump structure 1113*a*, so that the optical element 21 is clamped between the first groove 1111 by the bump structure 1113*a*. Therefore, the fixing effect of the fixing mechanism 100 can be further improved.

In this embodiment, the first sidewall 111, the first extending portion 1112 and the first abutting portion 1113 are, for example, integrally formed, but not limited thereto. In another embodiment, the first sidewall 111, the first extending portion 1112 and the first abutting portion 1113 may be independent and different elements and are then assembled together. The first sidewall 111, the first extending portion 1112 and the first abutting portion 1113 may be made of different materials when they are independent and different elements. For example, the first extending portion 1112 may be made of a flexible material, and the first abutting portion 1113 may be made of a relatively soft material, such as rubber or soft plastic material, so as to avoid scratching the optical element 21 when the first abutting portion 1113 abuts against the optical element 21.

In this embodiment, the first fixing rod 110 further has a bearing block 1114 protruding outward from the first fixing rod 110. The bearing block 1114 is arranged on one side of the first groove 1111, and the first extending portion 1112 is arranged on the other side of the first groove 1111, that is, the bearing block 1114 and the first extending portion 1112 are opposite to each other. The optical element 21 bears against the bearing block 1114 when the first abutting portion 1113 abuts against the optical element 21. The function of the bearing block 1114 is to further enhance the fixing effect of the fixing mechanism 100. The bearing block 1114 in this embodiment is shaped like a rectangular parallelepiped as an example, but not limited thereto, as long as the shape and size of the bearing block 1114 does not affect the setting of the optical element 21 and can be stably fixed to the fixing mechanism 100.

Figure 4:
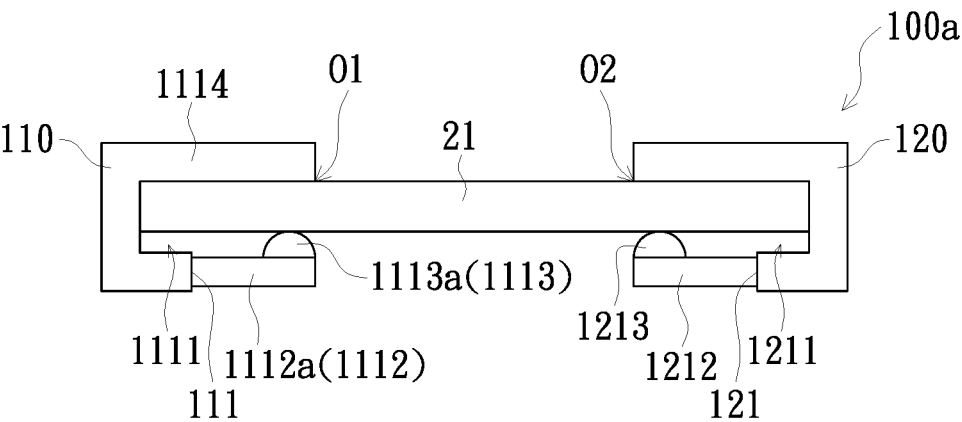
FIG. 4 is a schematic top view of a fixing mechanism fixing an optical element according to another embodiment of the present invention.

FIG. 4 is a schematic top view of a fixing mechanism fixing an optical element according to another embodiment of the present invention. Referring to FIG. 4, the fixing mechanism 100*a* of this embodiment is similar in structure and advantages to the aforementioned fixing mechanism 100, and only the main differences in structure are described below. In the fixing mechanism 100*a* of this embodiment, the second fixing rod 120 has a second sidewall 121. The second fixing rod 120 has, for example, a second extending portion 1212 protruding outward from the second sidewall 121 and a second abutting portion 1213. The second groove 1211 is located beside the second extending portion 1212. The second extending portion 1212 is connected between the second sidewall 121 and the second abutting portion 1213. The second abutting portion 1213 abuts against the optical element 21. In general, the configuration of the second extending portion 1212 and the second abutting portion 1213 is similar to that of the first extending portion 1112 and the first abutting portion 1113, and the specific embodiments of the second extending portion 1212 and the second abutting portion 1213 may refer to the related description about the extending block 1112*a* and the bump structure 1113*a*. In this embodiment, the fixing mechanism 100*a* can fix the two ends of the optical element 21 so can provide a more stable fixing effect, compared with the fixing mechanism 100.

The second fixing rod 120 may also have the bearing block 1114 opposite to the second extending portion 1212. The specific structure of the connection between the fixing mechanisms 100, 100*a* and the optical element 21 of the present invention is not limited to the above-mentioned embodiments. The connection between the fixing mechanisms 100, 100*a* and the optical element 21 can be achieved by any or a combination of the above-mentioned methods; or other methods can also be used according to different design requirements.

In summary, in the fixing mechanism of the embodiment of the invention, the first fixing rod has the first sidewall, the first fixing rod forms the first groove, the first sidewall is connected to the first extending portion protruding outward from the first sidewall and the first abutting portion, and the second fixing rod forms the second groove. When the optical element is arranged in the fixing mechanism, one end of the optical element is accommodated in the first groove, the other end of the optical element is accommodated in the second grooves, and the first abutting portion connected to the first extending portion is abutted against the optical element. Thus, even though the first groove and the second groove may cause gaps between the optical element and the first groove and the second groove due to tolerances during the manufacture process, the optical element can still be fixed to the fixing mechanism by abutting the first abutting portion against the optical element, thereby reducing the deviation of the transmitted light caused by the shaking of the optical element. Because adopting the fixing mechanism, the projection device of the embodiment of the invention can fix the placement position of the optical element, so as to reduce the light deviation and improve the brightness uniformity of the projection image.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A fixing mechanism configured to fix an optical element, the fixing mechanism comprising a first fixing rod and a second fixing rod, wherein
the first fixing rod has a first sidewall and forms a first groove, the first sidewall is connected to a first extending portion protruding outward from the first sidewall and a first abutting portion, the first groove is located beside the first extending portion, and the first extending portion is connected between the first sidewall and the first abutting portion; and
the second fixing rod has a second sidewall and forms a second groove, the second groove faces the first groove, wherein a first end of the optical element is accommodated in the first groove, a second end of the optical element is accommodated in the second groove, and the first abutting portion abuts against the optical element thereby fixing the optical element in the fixing mechanism,
wherein the first fixing rod further has a first top surface and a first bottom surface, the first sidewall is connected to the first top surface and the first bottom surface, and the first groove extends from the first top surface toward the first bottom surface, wherein the second fixing rod further has a second top surface and a second bottom surface, the second sidewall is connected to the second top surface and the second bottom surface, and the second groove extends from the second top surface toward the second bottom surface.

2. The fixing mechanism according to claim 1, wherein the first extending portion comprises an extending block, a first side of the extending block is connected to the first sidewall, and a second side of the extending block is connected to the first abutting portion.

3. The fixing mechanism according to claim 2, wherein the extending block is flexible.

4. The fixing mechanism according to claim 1, wherein the first abutting portion comprises a bump structure, and the bump structure protrudes from the first extending portion toward the optical element.

5. The fixing mechanism according to claim 4, wherein the first groove has a first side surface and a second side surface opposite to each other, the first extending portion is adjacent to the first side surface, and a shortest distance from a top of the bump structure to a plane extending from the second side surface is smaller than a distance from the first side surface to the second side surface.

6. The fixing mechanism according to claim 1, wherein the first groove has a first opening, the second groove has a second opening, and the first opening is substantially aligned with the second opening.

7. The fixing mechanism according to claim 1, wherein the second fixing rod further has a second extending portion protruding outward from the second sidewall and a second abutting portion, the second groove is located beside the second extending portion, the second extending portion is connected between the second sidewall and the second abutting portion, and the second abutting portion abuts against the optical element.

8. The fixing mechanism according to claim 1, wherein the first fixing rod further has a bearing block protruding outward, the bearing block is arranged on a first side of the first groove, the first extending portion is arranged on a second side of the first groove, and the optical element bears against the bearing block when the first abutting portion abuts against the optical element.

9. The fixing mechanism according to claim 1, wherein the optical element is in a shape of a flat plate.

10. The fixing mechanism according to claim 1, wherein the first sidewall, the first extending portion and the first abutting portion are integrally formed.

11. A projection device, comprising a light source, an optical engine module and a projection lens, wherein the light source is configured to provide an illumination beam;

the optical engine module comprises a housing, an optical element, a fixing mechanism, a light-homogenizing element and a light valve, wherein the fixing mechanism is arranged in the housing and is configured to fix the optical element, and the fixing mechanism comprises a first fixing rod and a second fixing rod, wherein the first fixing rod has a first sidewall and forms a first groove, the first sidewall is connected to a first extending portion protruding outward from the first sidewall and a first abutting portion, the first groove is located beside the first extending portion, and the first extending portion is connected between the first sidewall and the first abutting portion; and the second fixing rod has a second sidewall and forms a second groove, the second groove faces the first groove, wherein a first end of the optical element is accommodated in the first groove, a second end of the optical element is accommodated in the second groove, and the first abutting portion abuts against the optical element thereby fixing the optical element in the fixing mechanism;

wherein the first fixing rod further has a first top surface and a first bottom surface, the first sidewall is connected to the first top surface and the first bottom surface, and the first groove extends from the first top surface toward the first bottom surface, wherein the second fixing rod further has a second top surface and a second bottom surface, the second sidewall is connected to the second top surface and the second bottom surface, and the second groove extends from the second top surface toward the second bottom surface;

the light-homogenizing element is located on a transmission path of the illumination beam and is configured to transmit the illumination beam to the light valve; and the light valve is arranged in the housing and located on the transmission path of the illumination beam and is configured to convert the illumination beam into an image beam; and the projection lens is arranged in the housing and located on a transmission path of the image beam and is configured to project the image beam out of the projection device, wherein the optical element is arranged on the transmission path of the illumination beam or the transmission path of the image beam.

12. A fixing mechanism configured to fix an optical element, the fixing mechanism comprising a first fixing rod and a second fixing rod, wherein the first fixing rod has a first sidewall and forms a first groove, the first sidewall is connected to a first extending portion protruding outward from the first sidewall and a first abutting portion, the first groove is located beside the first extending portion, and the first extending portion is connected between the first sidewall and the first abutting portion; and the second fixing rod has a second sidewall and forms a second groove, the second groove faces the first groove, wherein a first end of the optical element is accommodated in the first groove, a second end of the optical element is accommodated in the second groove, and the first abutting portion abuts against the optical element thereby fixing the optical element in the fixing mechanism;

wherein the first abutting portion comprises a bump structure, and the bump structure protrudes from the first extending portion toward the optical element;

wherein the first groove has a first side surface and a second side surface opposite to each other, the first extending portion is adjacent to the first side surface, and a shortest distance from a top of the bump structure to a plane extending from the second side surface is smaller than a distance from the first side surface to the second side surface.

* * * * *